Patented May 23, 1944

2,349,654

UNITED STATES PATENT OFFICE 2,349,654

AQUEOUS SOLUTIONS OF PHENOLS AND THEIR HOMOLOGUES AND A METHOD OF MAKING THE SAME

Hans Goebel, Berlin-Reinickendorf, Germany, assignor to Sherka Chemical Co. Inc., Bloomfield, N. J., a corporation of New York No Drawing. Application February 21, 1941, Serial No. 379,952. In Germany March 5, 1940

5 Claims. (Cl. 167—31)

This invention relates to aqueous solutions of phenols and their homologues and a method of making the same.

The use of phenols, cresols, xylenols and their halogen substituted derivatives as disinfectants is well known. In order to make aqueous solutions of said compounds as they are to be used for disinfection purposes, it is necessary to render them water soluble, for instance, by sodium hydroxide, soap, Turkey red oil or by sulfonating. On examining such disinfectants an alkaline or neutral pH was found; furthermore, it was observed that the disinfecting effect of the phenols thus dissolved is considerably smaller than that of the free phenols.

It has now been found, that it is possible to render phenols and their homologues, as well as their halogenated derivatives soluble in water, without altering their phenolic properties, i. e. their highly acidic character by dissolving them in neutral solutions of condensation products of sulfanilic acid, formaldehyde (about 40% aqueous solution of formaldehyde), and thymols. Such clear solutions may be diluted with any amount of water, have a rather low pH (3 to 4) and consequently they contain the effective substance in the form of a free phenol. Accordingly their disinfecting effect is very high, measured, for instance, as phenol coefficient; it varies from 4 to 9 according to the kind of bacteria tested. Instead of sulfanilic acid other amino sulfonic acids, for instance, naphthionic acid and the like may be used for the manufacture of the condensation products employed for preparing neutral phenol solutions, and in the place of thymol other phenols or even secondary alcohols, for example, normal propyl phenol, cresol, cyclo-hexanol, isopropyl or iso butyl alcohol. Such condensation products are described, for instance, in the copending application of Binkhard von Becker, Serial No. 366,020.

According to this application said condensation products are obtained by proceeding as follows:

Amino sulfonic acids such as sulfanilic acid, amino ethane sulfonic acid, naphthionic acid or their salts are reacted with hydroxy benzylic alcohols in neutral or slightly alkaline aqueous solution. By addition of 1 mol of formaldehyde products of still higher molecular weight are obtained. Instead of using hydroxy benzylic alcohols the reaction may be carried out by heating a mixture of phenols capable of forming alkylol compounds, formaldehyde and alkali with the above mentioned amino sulfonic acids. Thymol, cresol, a cresol mixture, phenol, tertiary butyl phenol, salicylic acid or other phenols may be used as the one reaction compound for said condensation products.

More specifically, and as described in the above named application, the condensation products may be prepared, for example, by dissolving 40 parts by weight of thymol in 150 parts of 10% sodium hydroxide solution and adding thereto, 45 parts of 40% formaldehyde in the cold. After standing for 2-3 days at room temperature, there are added 53 parts by weight of sulfanilic acid. The mixture is boiled for 10 to 20 minutes, yielding a yellowish mass which on heating becomes a clear liquid which crystallizes on cooling. This mass, after boiling with 20–30 parts of formaldehyde, becomes viscous and unable to crystallize. A solubilizing agent may also be prepared by dissolving 19 parts of sulfanilic acid with 16 parts of barium hydroxide $(Ba(OH)_2.8H_2O)$ in 100 parts of water. 9.5 parts of phenol and 10 parts of 35% formaldehyde are then added and the mixture boiled for 10 minutes. Upon addition of 30% aqueous alcohol to the clear, highly viscous solution so obtained, an amorphous precipitate is separated which is readily soluble in water. A naphthionic acid condensate may be prepared by dissolving 25 parts by weight of the sodium salt of the acid in 25 parts of water, mixing in 15 parts of tertiary butyl phenol and 8 parts of 40% formaldehyde, and boiling for 20 minutes. There results a clear liquid which becomes highly viscous on cooling, and on evaporation becomes brittle and glass like, and easy to pulverize.

The following examples serve to illustrate the invention, without, however, limiting the same to them:

Example 1

100 parts of chlorinated p-cresol are dissolved in 400 parts of a condensation product of sulfanilic acid, formaldehyde and thymol, at ordinary temperature; thereupon 500 parts of water are added. The condensation product may be prepared as described above.

Example 2

100 parts of isomeric chloro thymol are dissolved in 400 parts of a condensation product of naphthionic acid, formaldehyde and cresol whereupon the solution is diluted with 500 parts of water.

Instead of the chloro-p-cresol or chloro thymol other halogenated or non-halogenated phenols, such as chloro-m-cresol, halogenated xylenol and others may be used for this process.

Of course, many other changes and variations in the reaction conditions, the solvents used, the reaction temperature and duration, the methods of working up and isolating the reaction products, and the like may be made by those skilled in the art in accordance with the principles set forth herein and in the claims annexed hereto.

What I claim is:

1. Process for preparing solutions of phenols and of their halogenated derivatives, comprising dissolving the phenol in an aqueous solution of a soluble condensation product of an amino sulfonic acid, formaldehyde, and a member of the group consisting of phenols, and secondary alcohols.

2. Process as claimed in claim 1, wherein the solvent for the phenol solute is an aqueous solution of a condensation product of sulfanilic acid, formaldehyde and thymol.

3. An aqueous solution of a member of the group consisting of halogenated and unhalogenated phenols, and a condensation product of an amino sulfonic acid, formaldehyde and a member of the group consisting of phenols and secondary alcohols.

4. An aqueous solution comprising approximately 100 parts of chlorinated p-cresol, and 400 parts of a soluble condensation product of sulfanilic acid, formaldehyde, and thymol.

5. An aqueous solution comprising approximately 100 parts of isomeric chlorothymol, and 400 parts of a soluble condensation product of naphthionic acid, formaldehyde, and thymol.

HANS GOEBEL.